Oct. 18, 1960 F. W. CHAPMAN 2,957,081
RADIATION DETECTOR

Filed Nov. 9, 1954 2 Sheets-Sheet 1

INVENTOR
Frederick W. Chapman
BY
L. P. Burch
ATTORNEY

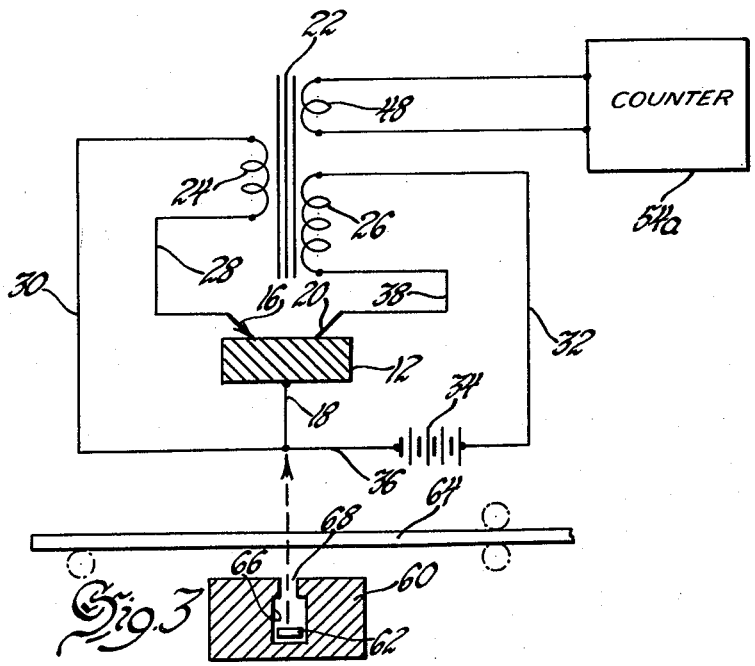
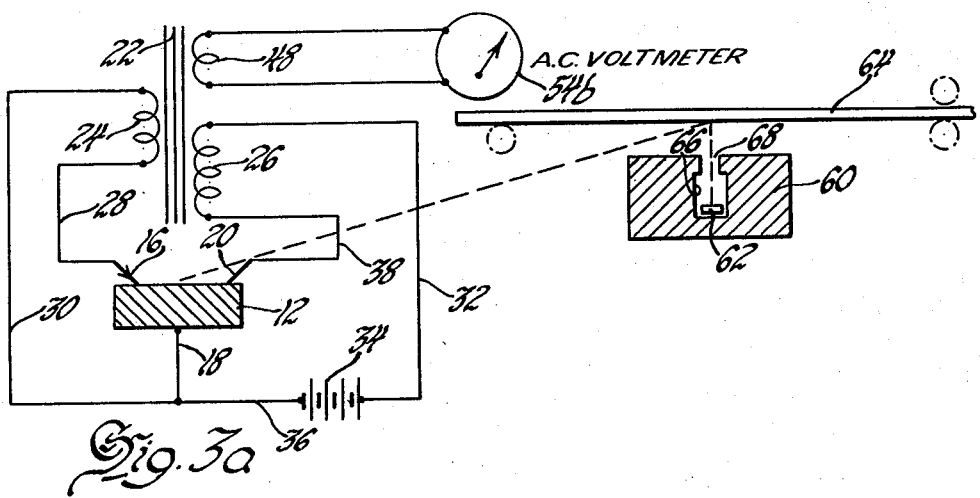

2,957,081

RADIATION DETECTOR

Frederick W. Chapman, Birmingham, Mich., assignor to General Motors Corporation, Detroit, Mich., a corporation of Delaware Filed Nov. 9, 1954, Ser. No. 467,759

7 Claims. (Cl. 250—83.3)

This invention relates to nuclear radiation responsive devices for detecting and measuring the intensity of nuclear and cosmic radiation. The invention has for its general object to provide a novel form of nuclear radiation detection and measuring apparatus suited for use as a nuclear radiation monitor and in thickness measuring gauges and other industrial installations.

The invention makes use of the variable electrical conductivity property exhibited by a semi-conductor device when subjected to nuclear radiation and employs such a device in a simple transistor oscillator circuit in which the changes in conductivity of the semi-conductor are used to effect changes in both the amplitude and frequency of the generated oscillatory currents. The changes in the oscillatory currents are translated either by electro-acoustic transducer means into readily discernible audible frequency tones or by amplitude and/or frequency responsive utilizing or indicating devices into indications of the intensity of the radiation impinging on the semi-conductor.

The manner in which the above objects are accomplished and applications of the principle of the invention will appear more fully from the following description and drawings wherein:

Figs. 3 and 3a illustrate forms of nuclear radiation thickness measuring gauges using the transistor oscillator radiation detector of the present invention.

Figure 1:
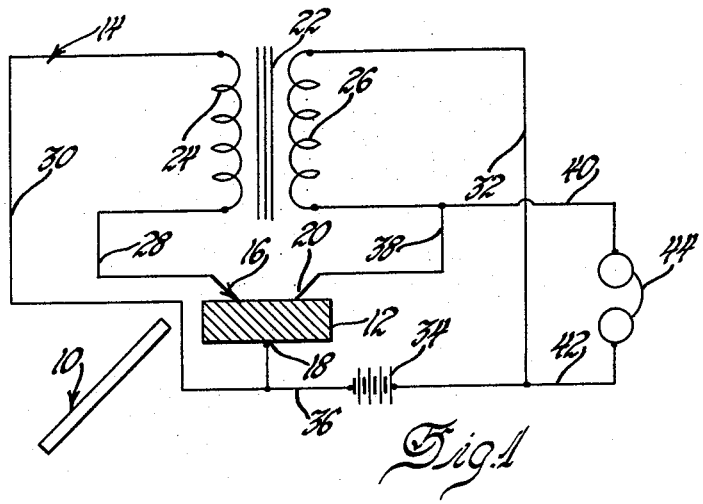
Fig. 1 illustrates a nuclear radiation detection scheme in accordance with the present invention using a simple transistor oscillator circuit.

Referring to the drawings there is shown in Fig. 1 a nuclear radiation detector that is responsive to radiation from radioactive source 10 and which includes a semi-conductor device 12 connected in a simple transistor oscillator circuit 14. For purposes of illustration, the source 10 may be a uranium glass rod or any radioactive substance, which may include radium, thorium, etc. or compounds thereof, that is brought near the semi-conductor device 12. The device 12 may be either a type PNP or NPN germanium transistor of either the junction or point contact variety having an emitter electrode 16, a base electrode 18 and a collector electrode 20. The oscillator 14 is shown as being of the basic tickler feedback variety in which the base electrode 18 of the transistor is common to the input circuit and output circuit of the oscillator which includes a coupling transformer 22 that provides the necessary regenerative coupling between the input and output circuits of the oscillator to start and maintain oscillations therein.

The transformer of Fig. 1 is shown as having a primary winding 24 and a secondary winding 26 with one side of the primary winding connected to the emitter electrode 16 over conductor 28 and the other side connected to the base electrode 18 over conductor 30. The secondary winding 26 of the transformer is contained in an output circuit which extends from one side of the secondary winding over conductor 32 to the positive terminal of a battery source 34, the negative terminal of which is connected over conductor 36 to the base electrode, and further includes the collector electrode 20 connected to the opposite side of the secondary transformer winding over conductor 38. Ideally, the transformer 22 should have a turn ratio to match the high output impedance to the low input impedance of the transistor.

Connected in shunt with the transformer secondary winding over conductors 40 and 42 is an electro-acoustic transducer device such as a conventional headphone unit 44 that may be employed where the range of oscillations generated by the transistor oscillator is in the audible frequency range. If the electro-acoustic transducer is a low impedance device, it, of course, would be connected serially in the output circuit so as not to shunt the output impedance of the coupling transformer.

The simple transistor oscillator of Fig. 1 generates oscillatory currents in the audio frequency range and has been found to be responsive to nuclear radiation emitted from a radioactive source. If the uranium glass rod 10 is brought near the transistor, there is a readily discerned shift in the pitch of the audible note, indicating a shift in the oscillating frequency. This shift is a function of and may be correlated to the intensity of the radiation impinging on the transistor. The frequency shift is accompanied by an amplitude variation, but the amplitude change is less noticeable with the electro-acoustic transducer, because the ear is relatively insensitive to amplitude variations.

A device of the type shown in Fig. 1 could be built in a very compact and inexpensive arrangement suitable for prospecting for radioactive ores such as carnotite and pitchblend. Other uses might include warning indicators for areas of contamination by nuclear fission products.

While the transistor oscillator is shown herein as being of the common or grounded base feedback variety, other forms of tickler oscillators using a grounded emitter also could be employed, and in some instances it may be preferred to employ other types of transistor oscillator circuits such, for example, as the Hartley, Colpitts or other known varieties.

Figure 2:
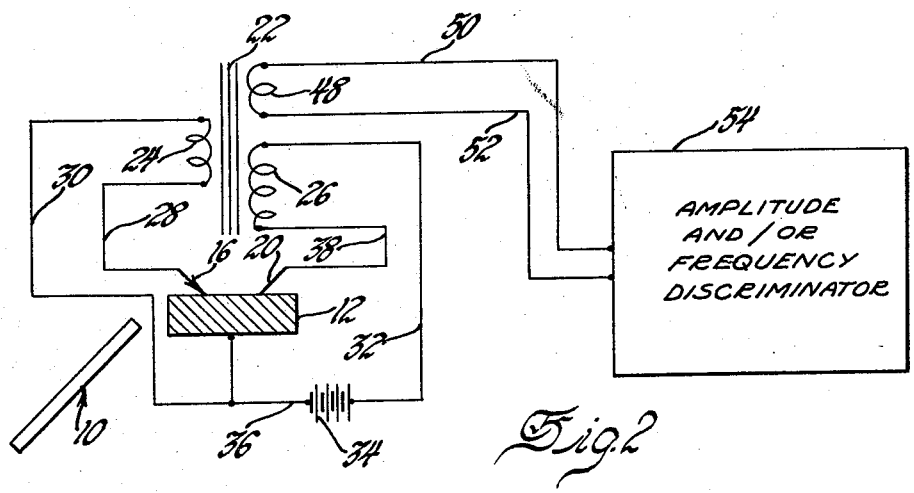
Fig. 2 illustrates a transistor oscillator radiation detection and measuring apparatus in accordance with the present invention.

Fig. 2 is a related form of transistor oscillator circuit used to obtain a quantitative measure of the radiation detected by the transistor oscillator of Fig. 1 and includes an auxiliary output winding 48 for the coupling transformer 22 which winding is connected over conductors 50 and 52 to a suitable amplitude and/or frequency discriminator 54. The device 54 may be a conventional timed cycle-counter designated in Fig. 3 and which, depending upon the range of the oscillations, could be of the electronic variety, a simple odometer counter or combination electronic and mechanical counter providing a time integrated average of a number of cycles per unit of time. Other known forms of frequency discriminating or measuring apparatus operative over the range of frequencies generated by the oscillator also could be used.

While it is somewhat easier, generally speaking, to provide more accurate measurements of frequency than amplitude, the aforementioned accompanying amplitude change in the oscillatory currents of the oscillator due to radiation impinging the semi-conductor could be measured by suitable amplitude responsive devices such, for example, as an A.C. voltmeter as shown in Fig. 3a or a full-wave rectifier bridge and a D.C. voltmeter, a biased detector device or a plurality of such devices biased to different conducting levels to indicate a particular range of output levels. The indication of the device 54 will constitute a measure of the intensity of the nuclear radiation in the vicinity in which the transistor oscillator is placed.

Figs. 3 and 3a illustrate the use of the transistor oscillator radiation detector and measuring apparatus of Fig. 2 in a thickness measuring installation of the transmission and reflection variety, respectively, and include a shield or container 60 for a source 62 of radioactive material emitting nuclear radiation in a beam or path intercepted by a sheet 64 of material of unknown density thickness to be measured.

In the transmission type of thickness gauge of Fig. 3 the transistor oscillator radiation detector would be located on the opposite side of the sheet 64 from the radiation source as shown and would measure the attenuation of the radiation from the radiation source. The number of radiation particles reaching the detector per unit of time, or the energy of the detected radiation, is measured first with the material of unknown thickness interposed between the radiation source and the detector, and then with the material removed from the path of the beam. The percentage difference in the two readings is then taken as a measure of the density thickness product of the interposed material.

In the reflection type instrument of Fig. 3a, the transistor oscillator radiation detector of the present invention would be positioned on the same side of the sheet as the radiation source and would be positioned to receive the back-scattered radiation reflected from the sheet. The ratio of the total primary radiation beam intensity available in the radiation producing source to the intensity of the back-scattered or reflected rays is then taken as a measure of the density-thickness product of the material.

The sheet 64 could be any material such as plastic, textile, paper, rubber or metal whose density thickness is to be measured. The shield or container 60 is composed of lead and has a cavity 66 defined therein with a small opening or window 68 through which the radiation is emitted from the source. The source 62 is located at the bottom of the cavity and may be a standard radiation source of any known radioactive material or radioactive isotopes of such material as are obtainable from the Atomic Energy Commission.

What is claimed is:

1. Apparatus for measuring the density-thickness of materials comprising the combination of a radioactive source emitting nuclear radiation in a path adapted to be intercepted by a material of unknown density-thickness and positioned on one side of said material, and a nuclear radiation detector on the other side of said material opposite said source, said detector including transistor oscillator means having regeneratively coupled input and output circuits and electrical transducer means coupled to the output circuit of said oscillator and responsive to the oscillations generated therein.

2. A reflection type nuclear radiation thickness measuring gauge for measuring the density-thickness of materials comprising the combination of a radioactive source emitting nuclear radiation in a path adapted to be intercepted by a material of unknown density-thickness and a nuclear radiation detector positioned to receive nuclear radiation reflected from said material and including transistor oscillator means having regeneratively coupled input and output circuits and electrical transducer means coupled to the output circuit of said oscillator and responsive to the oscillations generated therein.

3. Means for controlling the resonant frequency of an electrical circuit comprising, an oscillator having a transistor therein, a source of radioactivity disposed adjacent said transistor for regulating the amount of radioactivity striking said transistor.

4. Means for controlling the resonant frequency of an oscillator, said means comprising a transistor disposed in the resonant portion of said oscillator, a source of radioactivity adjustably disposed with respect to said transistor for regulating the amount of radioactivity striking said transistor.

5. Means for controlling the resonant frequency of an oscillator comprising, a transformer having a primary winding and a secondary winding, a transistor having the emitter electrode and base electrode interconnected with said primary and the collector electrode and base electrode interconnected with said secondary winding, a source of power in the secondary circuit, a source of radioactivity adjustably disposed adjacent said transistor for controlling the amount of radioactivity striking said transistor.

6. The method of detecting radioactive radiations comprising, the steps of generating an electrical signal in an oscillator having a transistor whose physical characteristics affect the resonant frequency of said circuit, exposing said transistor to radioactive radiations to thereby temporarily change the physical characteristics of said transistor whereby said resonant frequency will change, detecting changes in frequency of said signal resulting from said radiations.

7. The method of detecting radioactivity emanating from a workpiece comprising, the steps of generating an electrical signal in an oscillator having a transistor therein whose physical characteristics will determine the natural resonant frequency of said circuit, placing said workpiece and said transistor in proximity to each other whereby any radiations from said workpiece will strike said transistor for temporarily changing the physical characteristics thereof so that said natural resonant frequency will vary, detecting changes in the frequency of said signal.

References Cited in the file of this patent
UNITED STATES PATENTS

| | | |
|---|---|---|
| 2,556,296 | Rack | June 12, 1951 |
| 2,588,254 | Lark-Horovitz et al. | Mar. 2, 1952 |
| 2,670,441 | McKay | Feb. 23, 1954 |
| 2,706,792 | Jacobs | Apr. 19, 1955 |
| 2,708,720 | Anderson | May 17, 1955 |
| 2,839,678 | De Witz | June 17, 1958 |

OTHER REFERENCES

Transistor Oscillator Is Powered by Light, by R. F. Turner, from Radio-Electronics, vol. 24, No. 8, August 1953, p. 66.